United States Patent
Lee et al.

(10) Patent No.: US 10,289,258 B2
(45) Date of Patent: May 14, 2019

(54) FOLDABLE PORTABLE DEVICE INCLUDING DIFFERENT FOLDED STATES

(71) Applicant: LG ELECTRONICS INC., Seoul (KR)

(72) Inventors: Doyoung Lee, Seoul (KR); Sinae Chun, Seoul (KR); Juhwan Lee, Seoul (KR); Sihwa Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 67 days.

(21) Appl. No.: 15/513,007

(22) PCT Filed: Oct. 1, 2014

(86) PCT No.: PCT/KR2014/009265
§ 371 (c)(1),
(2) Date: Mar. 21, 2017

(87) PCT Pub. No.: WO2016/052778
PCT Pub. Date: Apr. 7, 2016

(65) Prior Publication Data
US 2017/0293383 A1    Oct. 12, 2017

(51) Int. Cl.
*G06F 3/048* (2013.01)
*H04M 1/02* (2006.01)
(Continued)

(52) U.S. Cl.
CPC ............ *G06F 3/048* (2013.01); *G06F 1/1615* (2013.01); *G06F 1/1641* (2013.01);
(Continued)

(58) Field of Classification Search
CPC ... G06F 3/01; G06F 3/03; G06F 3/041; G06F 3/048; G06F 3/0481; G06F 3/0488;
(Continued)

(56) References Cited

U.S. PATENT DOCUMENTS

| 2009/0189829 A1* | 7/2009 | Hiramatsu | G06F 1/1616 345/1.3 |
| 2010/0064244 A1* | 3/2010 | Kilpatrick, II | G06F 1/1616 715/773 |

(Continued)

FOREIGN PATENT DOCUMENTS

| KR | 10-2014-0094333 A | 7/2014 |
| WO | WO 2012/108668 A2 | 8/2012 |
| WO | WO 2013/115435 A1 | 8/2013 |

*Primary Examiner* — Xiomara L Bautista
(74) *Attorney, Agent, or Firm* — Birch, Stewart, Kolasch & Birch, LLP

(57) ABSTRACT

A method for controlling a portable device comprising a first body in the center thereof, a second body positioned on the left side of the first body and a third body positioned on the right side of the first body, according to one embodiment of the present specification, may comprise the steps of; detecting a first triggering signal if a first faulted state is converted to a second faulted state; displaying a menu interface in the converted second faulted state on the basis of the detected first triggering signal; detecting a first control input with respect to the displayed menu interface; and if the second faulted state is converted to a third faulted state, displaying a first application in the third faulted state on the basis of the first control input.

12 Claims, 19 Drawing Sheets

(51) Int. Cl.
*G06F 1/16* (2006.01)
*G06F 3/0481* (2013.01)

(52) U.S. Cl.
CPC .......... *G06F 1/1643* (2013.01); *G06F 1/1677* (2013.01); *G06F 3/0481* (2013.01); *H04M 1/0214* (2013.01); *H04M 1/0243* (2013.01); *H04M 1/0268* (2013.01)

(58) Field of Classification Search
CPC .... G06F 1/16; G06F 3/14; G06F 9/00; G09G 5/00; G09G 5/14; G09G 5/38; H04M 1/02; H04M 1/0214; H04B 1/38
See application file for complete search history.

(56) References Cited

U.S. PATENT DOCUMENTS

| | | | | |
|---|---|---|---|---|
| 2010/0064536 | A1* | 3/2010 | Caskey | G06F 1/1616 33/303 |
| 2010/0066643 | A1* | 3/2010 | King | G06F 1/1616 345/1.3 |
| 2010/0085274 | A1* | 4/2010 | Kilpatrick, II | G06F 1/1616 345/1.3 |
| 2012/0081271 | A1* | 4/2012 | Gimpl | G06F 1/1616 345/1.3 |
| 2013/0080931 | A1* | 3/2013 | Sirpal | G06F 3/1438 715/761 |
| 2013/0098857 | A1 | 4/2013 | Jarvis et al. | |
| 2013/0321340 | A1* | 12/2013 | Seo | G06F 1/1641 345/174 |

* cited by examiner

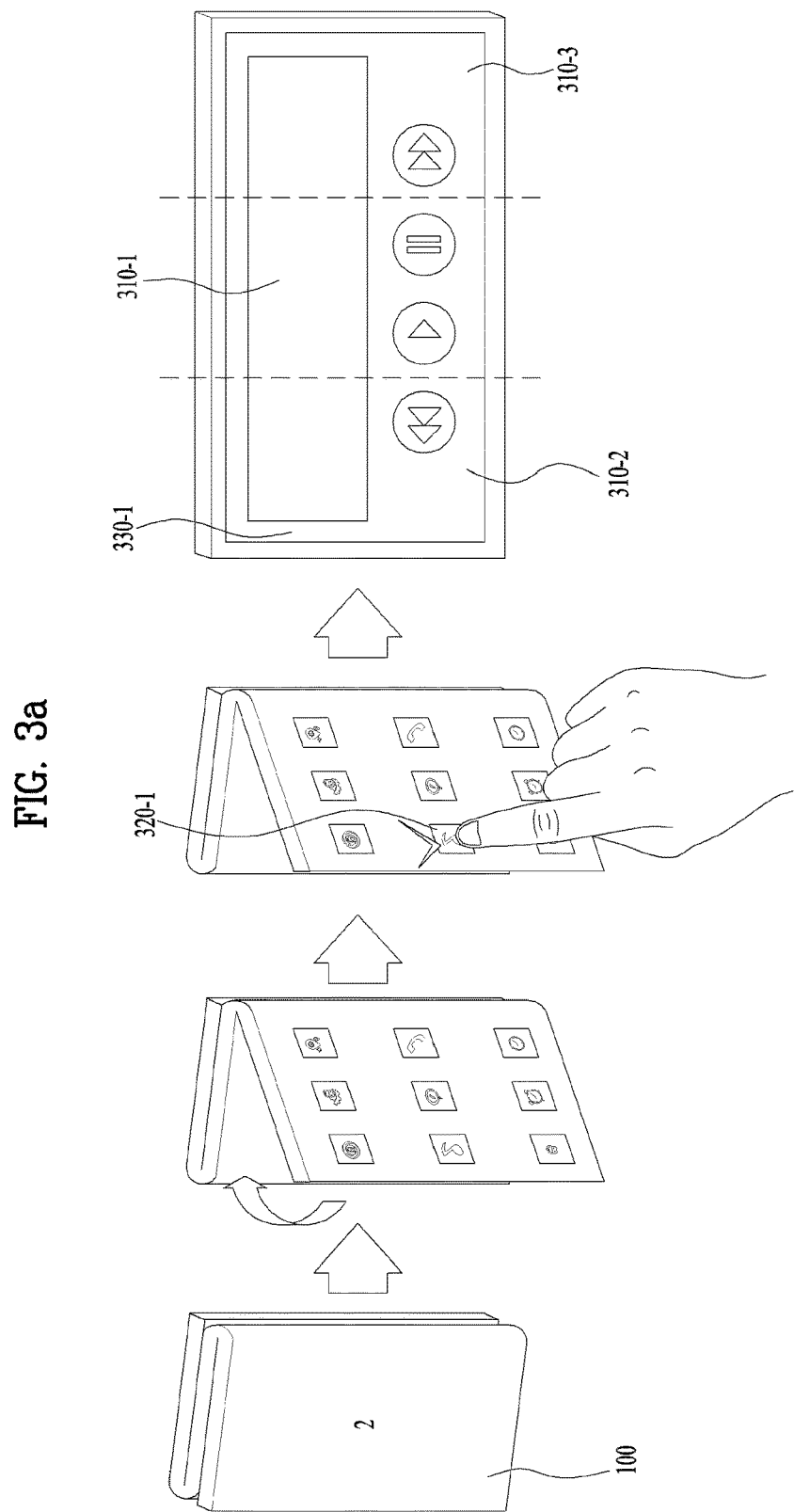

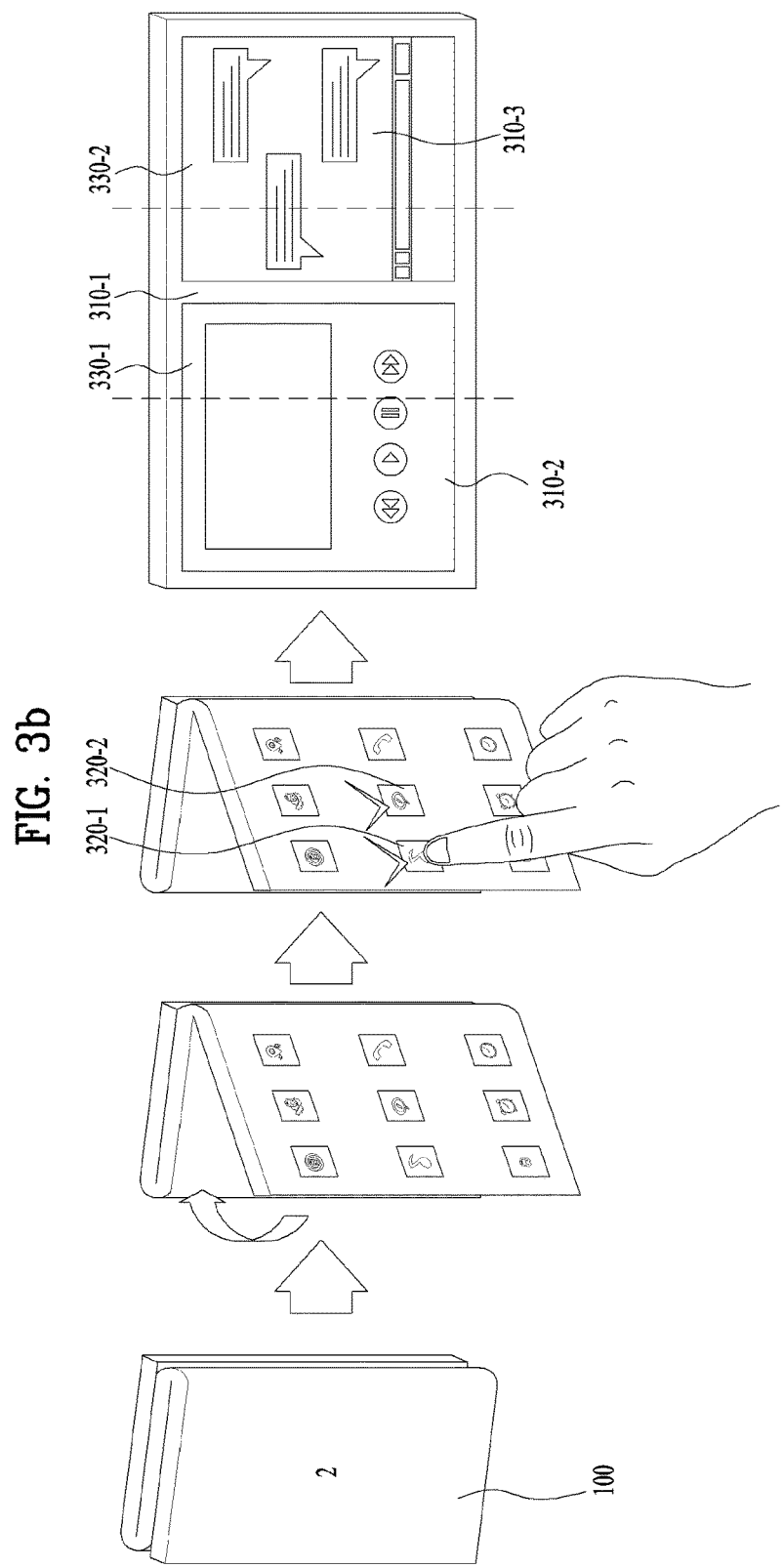

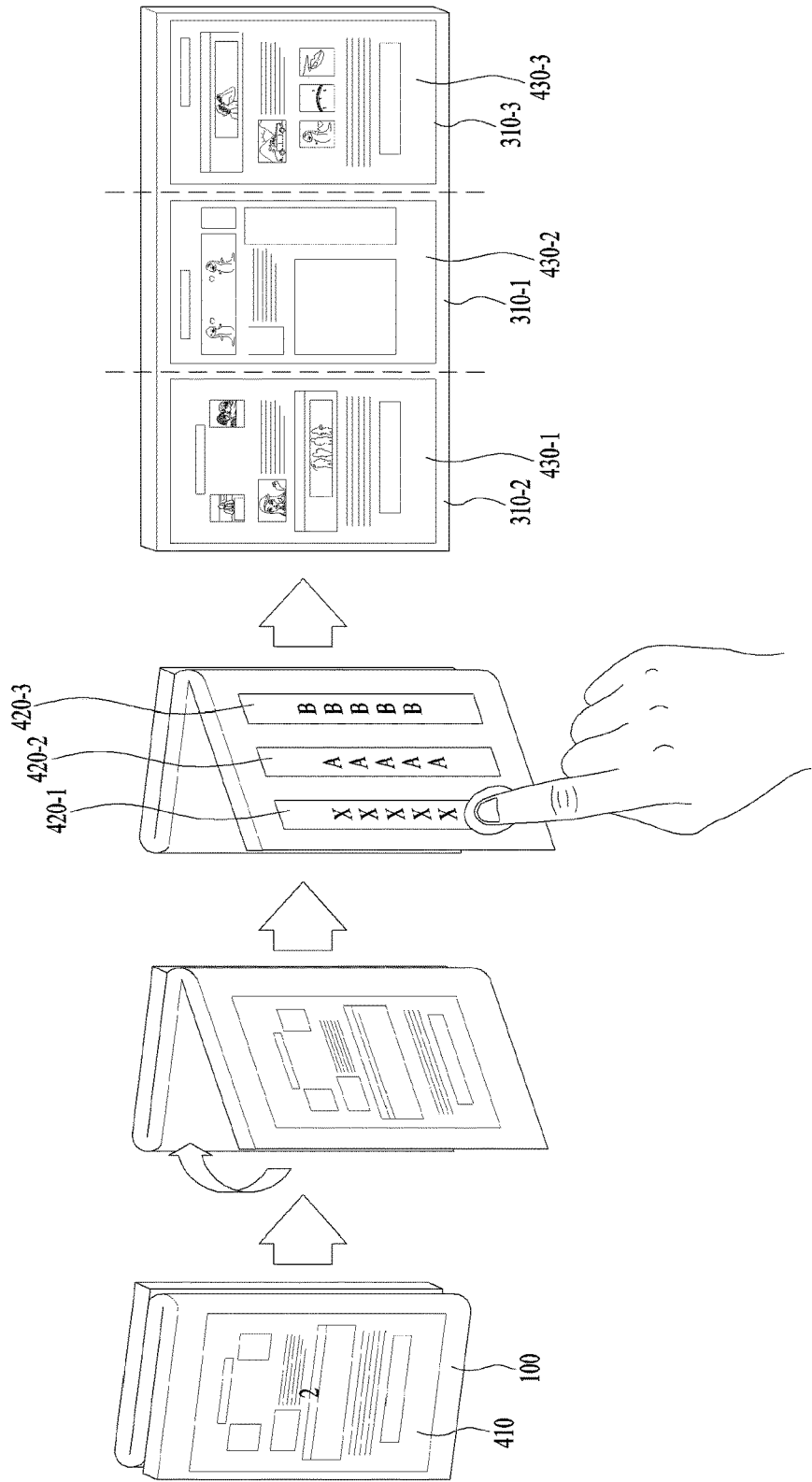

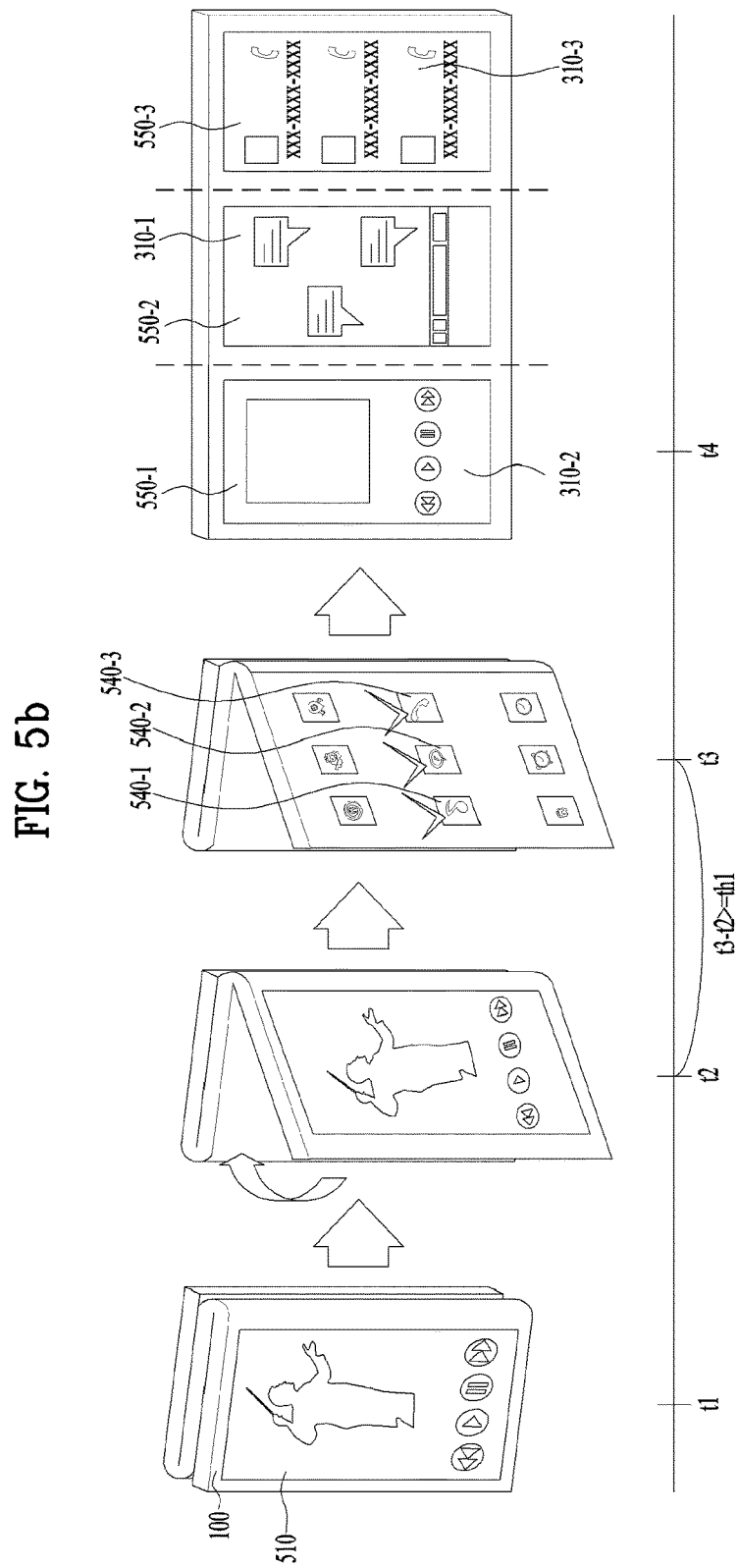

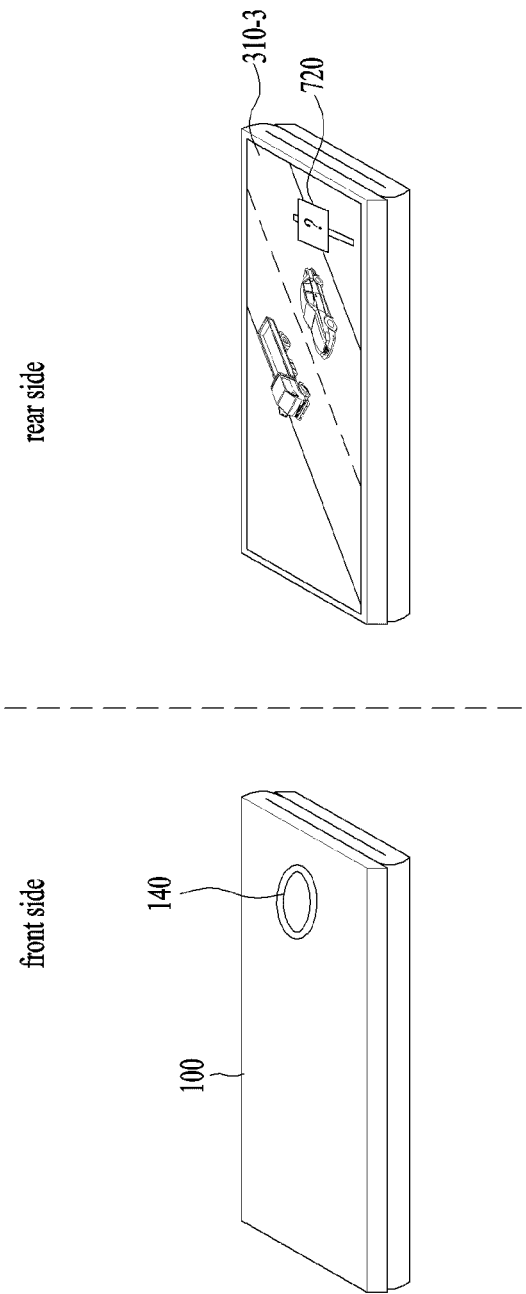

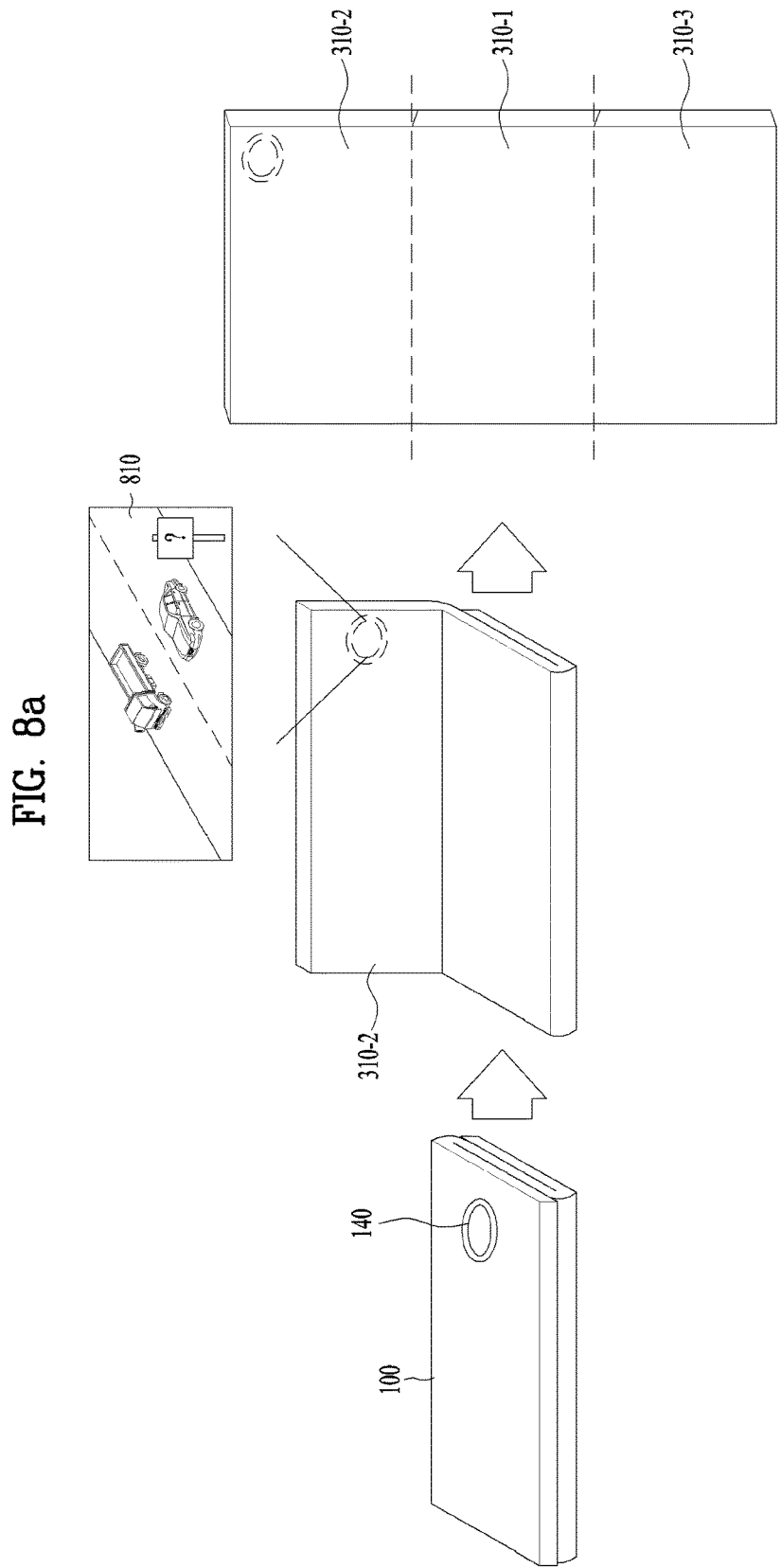

FIG. 8b
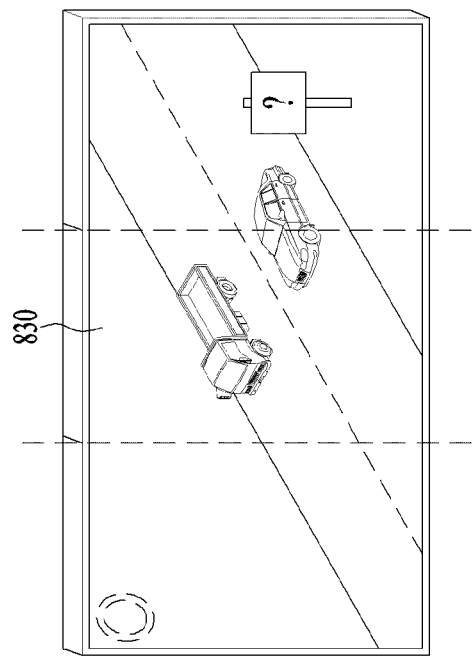
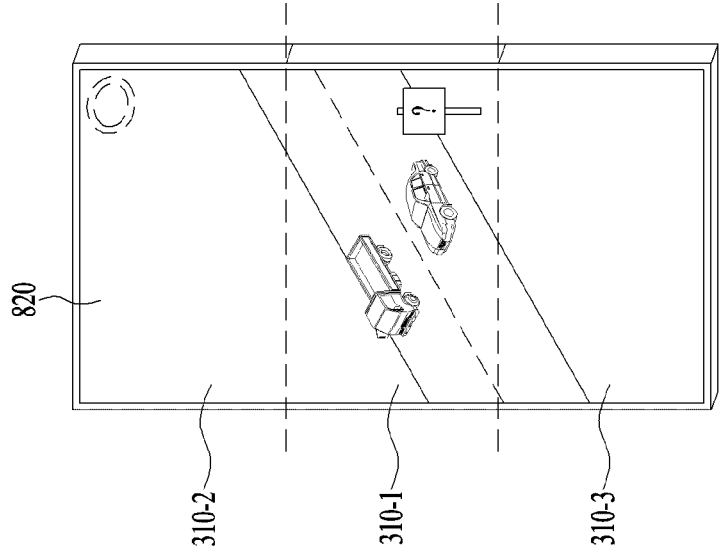

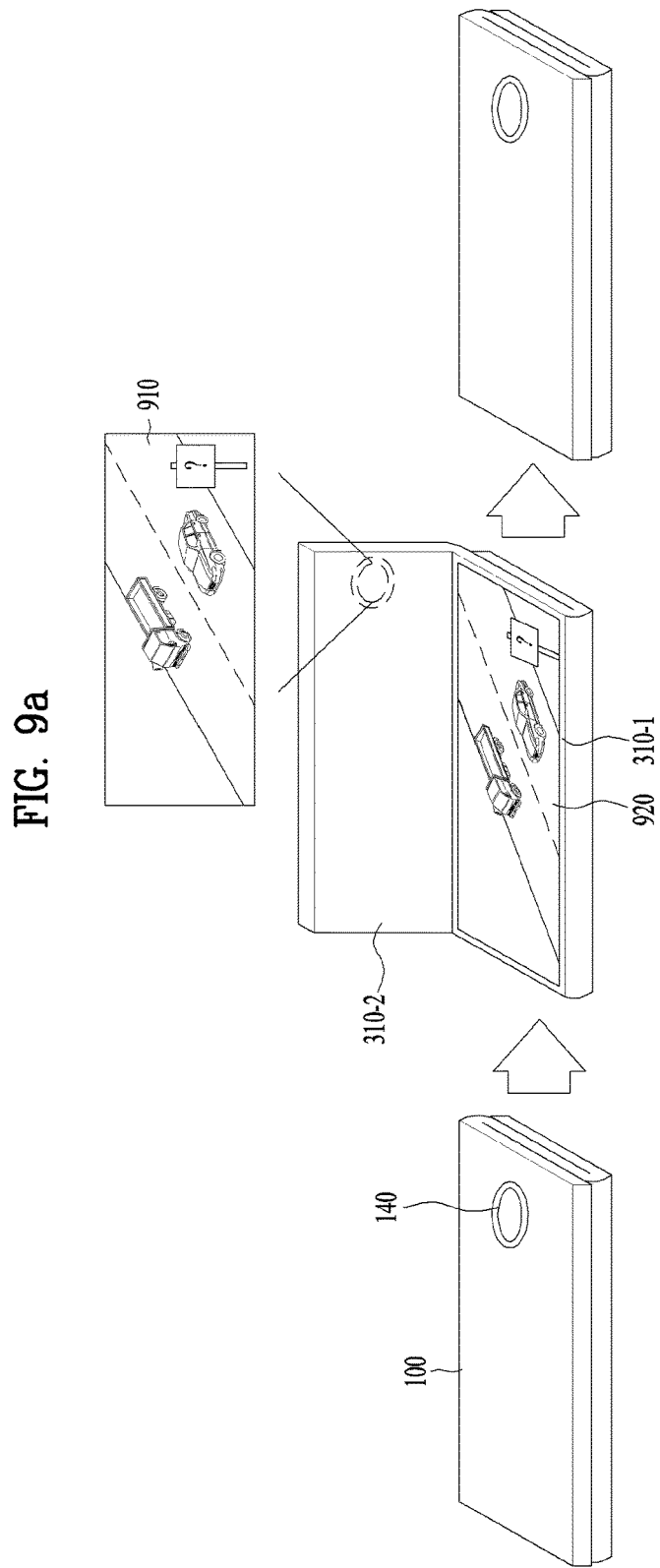

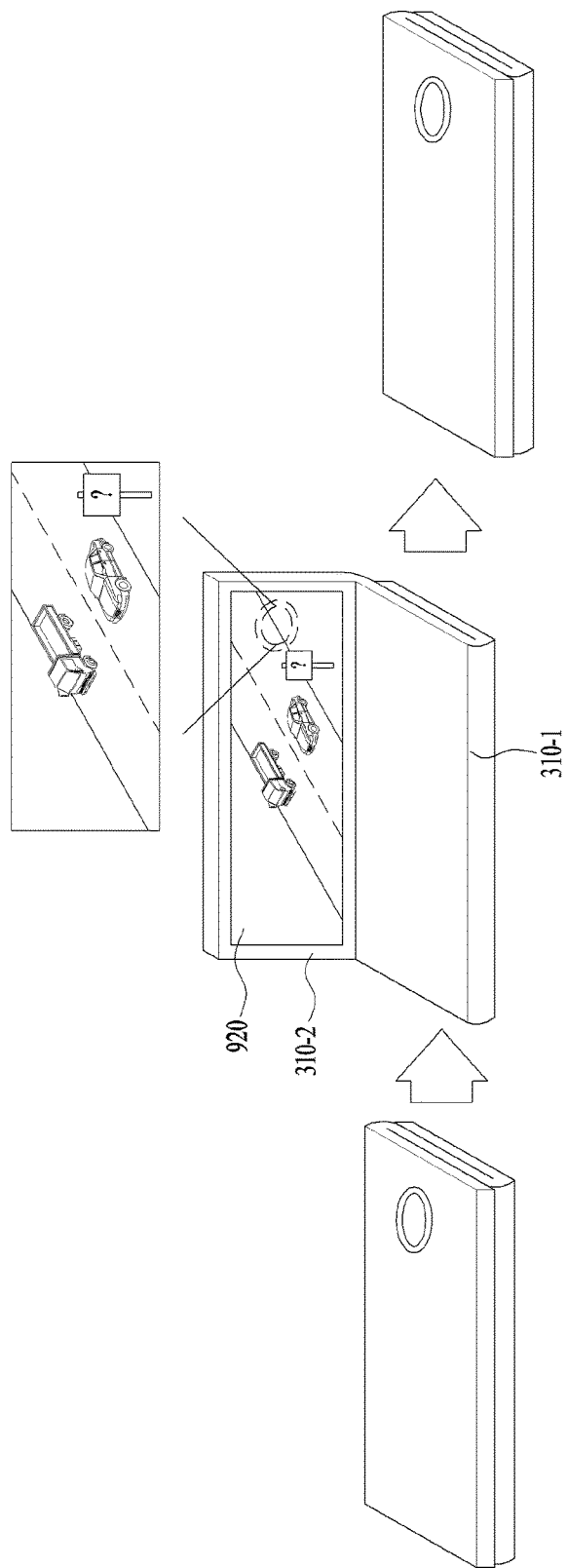

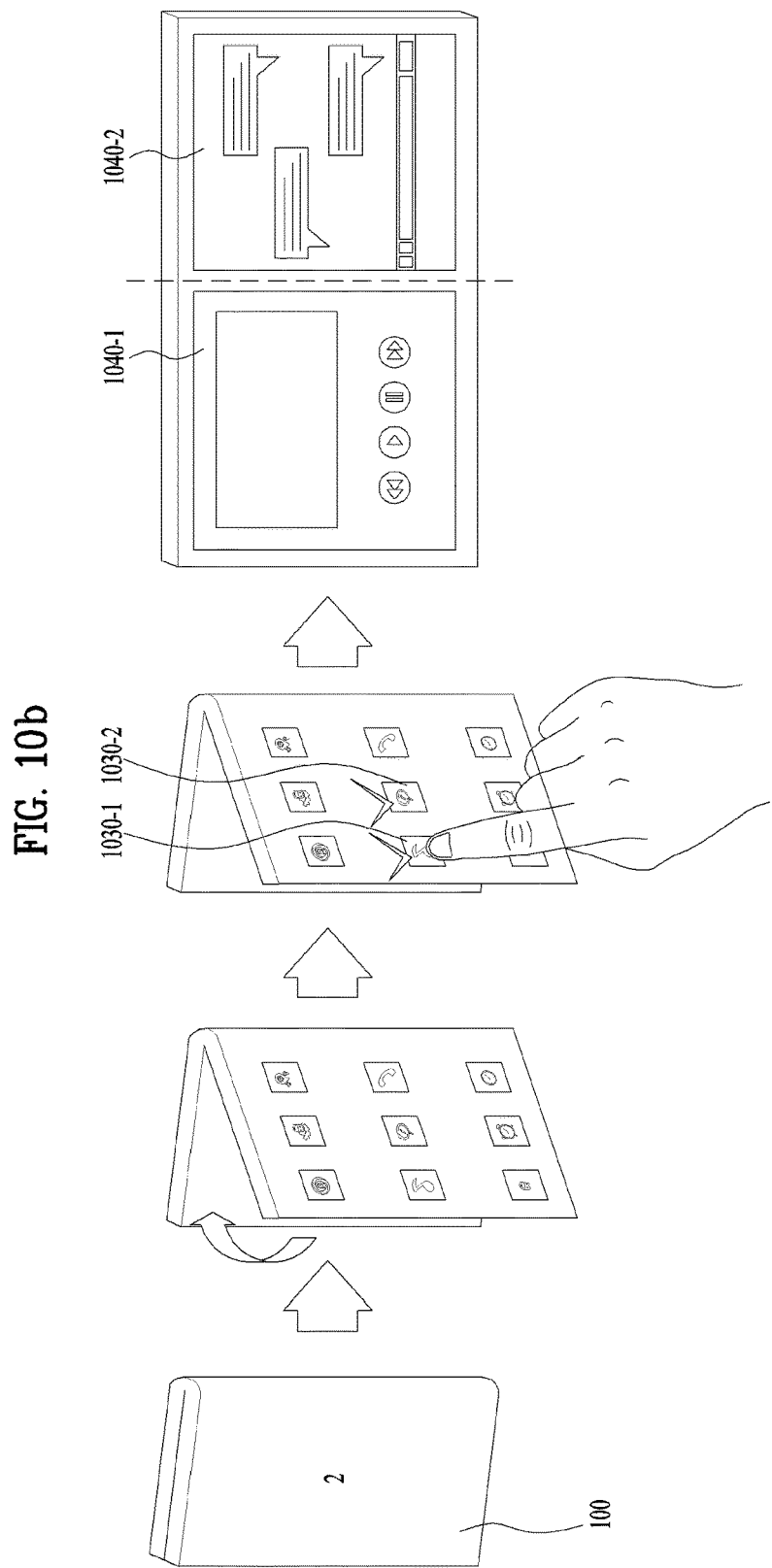

FOLDABLE PORTABLE DEVICE INCLUDING DIFFERENT FOLDED STATES

CROSS REFERENCE TO RELATED APPLICATIONS

This application is the National Phase of PCT International Application No. PCT/KR2014/009265, filed on Oct. 1, 2014, all of which are hereby expressly incorporated by reference into the present application.

TECHNICAL FIELD

The present invention relates to a portable device and a method of controlling therefor.

BACKGROUND ART

The use of a portable device equipped with a flexible display is increasing. In this case, the portable device equipped with the flexible display can provide a user with a wide screen. At the same time, the portable device equipped with the flexible display may have a foldable structure. With the help of the foldable structure, portability of the portable device can be enhanced. Recently, a portable device including three foldable bodies is proposed. In this case, the portable device may operate in a state that all bodies are folded. And, the portable device may operate in a state that all bodies are unfolded. In this case, an operation method of the portable device can be differently configured according to a folded state of the body. Hence, it is necessary to have a method of controlling the operation method.

DISCLOSURE OF THE INVENTION

Technical Tasks

One object of the present specification is to provide a portable device and a method of controlling therefor.

Another object of the present specification is to provide a portable device having a structure including a first body positioned at the center, a second body positioned on the left side of the first body, and a third body positioned on the right side of the first body.

Another object of the present specification is to provide a method for a portable device to display an interface based on a folded state of each body.

Another object of the present specification is to provide a method for a portable device to detect a triggering signal when a folded state of each body changes and execute an application based on the detected triggering signal.

Another object of the present specification is to provide a method for a portable device to detect a triggering signal when a threshold time elapses after a folded state of each body is changed and execute an application based on the detected triggering signal.

Another object of the present specification is to provide a method for a portable device to activate a camera unit based on a folded state of each body and capture an image.

The other object of the present specification is to provide a method for a portable device to display a preview image when the portable device captures an image.

Technical Solution

To achieve these and other advantages and in accordance with the purpose of the present invention, as embodied and broadly described, according to one embodiment, a portable device including a first body positioned at the center, a second body positioned on the left side of the first body, and a third body positioned on the right side of the first body can include a display unit configured to display visual information in at least one selected from the group consisting of a first area of the first body, a second area of the second body, and a third area of the third body, a folding sensor unit configured to detect whether or not at least one of the second body and the third body is folded into the first body, a control input sensing unit configured to detect a control input and forward the detected control input to a processor, and the processor configured to control the display unit, the folding sensor unit, and the control input sensing unit. In this case, if a first folded state is switched to a second folded state, the processor can detect a first triggering signal. The processor displays a menu interface based on the detected first triggering signal in the switched second folded state. The processor detects a first control input inputted on the displayed menu interface. If the second folded state is switched to a third folded state, the processor can display a first application based on the first control input in the third folded state.

The portable device can further include a camera unit configured to be positioned at the second body and capture a front image. In this case, if a first folded state is switched to a second folded state, the processor can detect a first triggering signal. The processor executes a camera application based on the detected first triggering signal in the second folded state. If a first control input inputted on the executed camera application is detected, the processor can capture the front image. If the second folded state is switched to the first folded state, the processor can display the front image in the third area in the first folded state.

To further achieve these and other advantages and in accordance with the purpose of the present invention, according to a different embodiment, a method of controlling a portable device including a first body positioned at the center, a second body positioned on the left side of the first body, and a third body positioned on the right side of the first body, includes the steps of if a first folded state is switched to a second folded state, detecting a first triggering signal, displaying a menu interface based on the detected first triggering signal in the switched second folded state, detecting a first control input inputted on the displayed menu interface, and if the second folded state is switched to a third folded state, displaying a first application based on the first control input in the third folded state.

A different method of controlling a portable device includes the steps of if a first folded state is switched to a second folded state, detecting a first triggering signal, executing a camera application based on the detected first triggering signal in the second folded state, if a first control input inputted on the executed camera application is detected, capturing the front image, and if the second folded state is switched to the first folded state, displaying the front image in the third area in the first folded state.

Advantageous Effects

According to the present specification, it is able to provide a portable device and a method of controlling therefor.

According to the present specification, it is able to provide a portable device having a structure including a first body positioned at the center, a second body positioned on the left side of the first body, and a third body positioned on the right side of the first body.

According to the present specification, a portable device can display an interface based on a folded state of each body.

According to the present specification, a portable device can detect a triggering signal when a folded state of each body changes and execute an application based on the detected triggering signal.

According to the present specification, a portable device can detect a triggering signal when a threshold time elapses after a folded state of each body is changed and execute an application based on the detected triggering signal.

According to the present specification, it is able to provide a method for a portable device to activate a camera unit based on a folded state of each body and capture an image.

According to the present specification, it is able to provide a method for a portable device to display a preview image when the portable device captures an image.

DESCRIPTION OF DRAWINGS

FIGS. 3a to 3c are diagrams of a method for a portable device to execute an application when a folded state is switched according to one embodiment of the present specification;

FIG. 4 is diagram of a method for a portable device to execute an application when a folded state is switched according to one embodiment of the present specification;

FIGS. 5a and 5b are diagrams of a method for a portable device to convert a folded state based on a threshold time according to one embodiment of the present specification;

FIGS. 7a and 7b are diagrams of a method for a portable device to capture an image using a camera unit according to one embodiment of the present specification;

FIGS. 8a and 8b are diagrams of a method for a portable device to display a captured image according to one embodiment of the present specification;

FIGS. 9a and 9b are diagrams of a method for a portable device to display a preview image for a captured image according to one embodiment of the present specification;

FIGS. 10a and 10b are diagrams of a method for a portable device including two bodies to execute an application;

BEST MODE

Hereinafter, preferred exemplary embodiments of the present specification that can best carry out the above-described objects of the preset specification will be described in detail with reference to the accompanying drawings. It will be apparent that the technical scope and spirit of the present specification will not be limited only to the exemplary embodiments set forth herein.

In addition, although the terms used in the present specification are selected from generally known and used terms, the terms used herein may be varied or modified in accordance with the intentions or practice of anyone skilled in the art, or along with the advent of a new technology. Alternatively, in some particular cases, some of the terms mentioned in the present specification may be selected by the applicant at his or her discretion, the detailed meanings of which are described in relevant parts of the description herein. Furthermore, it is required that the present specification is understood, not simply by the actual terms used but by the meaning of each term lying within.

Additionally, in the present specification, although terms such as first and/or second may be used to describe diverse elements of the present specification, it should be understood that the elements included in the present specification will not be limited only to the terms used herein. The above-mentioned terms will only be used for the purpose of differentiating one element from another element, for example, without deviating from the scope of the present specification, a first element may be referred to as a second element, and, similarly, a second element may also be referred to as a first element.

Moreover, throughout the entire description of the present specification, when one part is said to "include (or comprise)" an element, unless specifically mentioned otherwise, instead of excluding any other element, this may signify that the one part may further include other elements. Furthermore, the term "unit (or part)", which is mentioned in the present specification, refers to a unit for processing at least one function or operation, and this may be realized in the form of hardware, software, or in a combination of both hardware and software.

Figure 1:
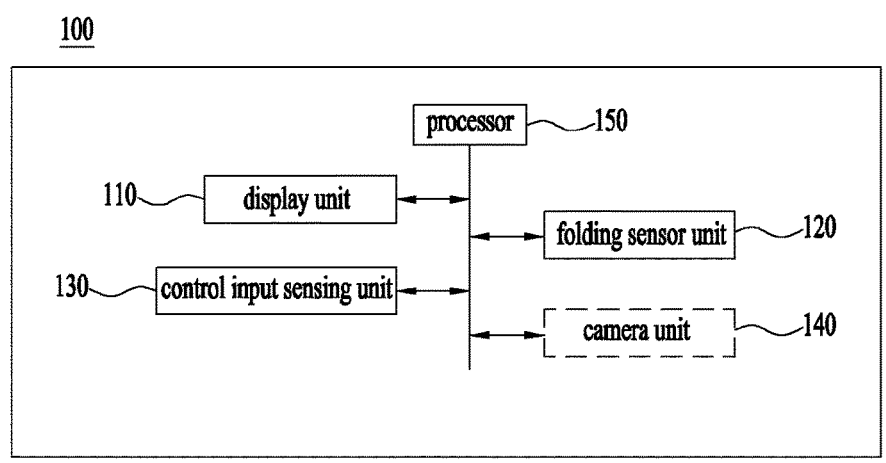
FIG. 1 is a block diagram for a portable device according to one embodiment of the present specification.

FIG. 1 is a block diagram for a portable device according to one embodiment of the present specification.

A portable device 100 may correspond to a device including a first body, a second body, and a third body. More specifically, the portable device may correspond to a device including a first body positioned at the center, a second body positioned on the left side of the first body, and a third body positioned on the right side of the first body. In this case, as an example, the portable device may correspond to a device folded on the basis of the first body positioned at the center. The second body positioned on the left side of the first body can be folded into the first body. The third body positioned on the right side of the first body can be folded into the first body. In particular, the portable device 100 may have a device structure including three foldable bodies. And, for example, the portable device may correspond to a flexible device. As an example, the first body, the second body, and the third body can be implemented by a single integrated structure. In this case, the portable device can determine the first body, the second body, and the third body based on whether or not the portable device of the flexible structure is folded. More specifically, since a flexible device is made of a bendable material, the device can be folded. In this case, as an example, if the flexible device is folded two times based on two folding lines, the flexible device can be divided into three areas. The three areas may correspond to the first body, the second body, and the third body. In particular, the portable device 100 may have a structure capable of being divided into three areas based on two folding lines, by which the present specification may be non-limited.

The portable device 100 can include a display unit 110, a folding sensor unit 120, a control input sensing unit 130, and a processor 150. And, the portable device 100 can further include a camera unit 140 as an optional configuration. In this case, as an example, each of the units may corresponds to a configuration element or a part constructing the portable device 100. In particular, each of the units may corresponds to an independent unit embedded in the portable device 100 to execute a function of the portable device 100, by which the present specification may be non-limited.

The display unit 110 can be controlled by the processor 150. In this case, the display unit 110 can display an image in at least one area selected from the group consisting of a first area of the first body, a second area of the second body, and a third area of the third body. In this case, as an example, the first body includes a first display unit and may be able to display an image in the first area using the first display unit. And, the second body includes a second display unit and may be able to display an image in the second area using the second display unit. And, the third body includes a third display unit and may be able to display an image in the third area using the third display unit. In particular, the display unit is separately included in each body to display an image in an area included in each body. And, as an example, the display unit 110 may correspond to a single integrated unit and may be able to display an image in each of the first area, the second area, and the third area, respectively. As an example, if the portable device 100 corresponds to a flexible display device, the display unit 110 may have an integrated structure. In this case, the display unit 110 can display an image in a first area, a second area, and a third area, respectively, based on folding of the flexible display device. In particular, the display unit 110 may correspond to a unit capable of respectively displaying an image in the first area of the first body, the second area of the second body, and the third area of the third body, by which the present specification may be non-limited.

And, as an example, the display unit 110 can display an image in a front side area and a rear side area of the first body, the second body, and the third body. More specifically, the first area can be set to either the front side or the rear side of the first body. And, the first area can be set to both the front side and the rear side of the first body. In particular, the portable device 100 can display an image in at least one of the front side and the rear side of each body, by which the present specification may be non-limited.

The portable device 100 can include a folding sensor unit 120. In this case, the folding sensor unit 120 can detect that the second body is folded into the first body. And, the folding sensor unit 120 can detect that the third body is folded into the first body. More specifically, as mentioned in the foregoing description, the second body can be folded into the first body. And, the third body can be folded into the first body. In this case, the folding sensor unit 120 detects that at least one of the second body and the third body is folded and can forward detected information to the processor 150. By doing so, the processor 150 can detect a folded state of the portable device 100. As an example, the folding sensor unit 120 can further detect a first folding angle between the first body and the second body. And, the folding sensor unit 120 can further detect a second folding angle between the first body and the third body. In this case, the first folding angle and the second folding angle may have a greatest angle in a state that the portable device is unfolded. In this case, the unfolded state may correspond to a state that the second body and the third body are unfolded. In particular, the unfolded state may correspond to a state that all of the first body, the second body, and the third body form the same plane.

The folding sensor unit 120 can detect whether or not the second body is folded based on the first folding angle. More specifically, if the first folding angle is less than a threshold angle, the folding sensor unit 120 can detect that the second body is folded into the first body. And, the folding sensor unit 120 can detect whether or not the third body is folded based on the second folding angle. More specifically, if the second folding angle is less than a threshold angle, the folding sensor unit 120 can detect that the third body is folded into the first body. In this case, the threshold angle may correspond to a threshold angle for determining whether or not each body is folded and may have a prescribed error range. In particular, if a folding angle of each body is less than a predetermined threshold angle, the folding sensor unit 120 detects folding of each body and can forward detected folding information to the processor 150.

As a different example, the folding sensor unit 120 can detect a degree of folding based on a distance between the first body and the second body. More specifically, if a first distance between the first body and the second body is less than a threshold distance, the folding sensor unit 120 can detect that the second body is folded. And, if the first distance between the first body and the second body is equal to or greater than the threshold distance, the folding sensor unit 120 can detect that the second body is unfolded. In particular, the folding sensor unit 120 can detect degree of folding of the first body and the second body based on a distance. And, as an example, the folding sensor unit 120 can detect degree of folding of the first body and the third body based on a distance. The degree of folding can be detected with the same method used for the second body.

The portable device 100 can include a control input sensing unit 130. In this case, the control input sensing unit 130 can forward a user input or environment recognized by the device to the processor 150 using at least one or more sensors installed in the portable device 100. More specifically, the control input sensing unit 130 can sense a control input of a user using at least one or more sensors installed in the portable device 100. In this case, the at least one or more sensing means can include various sensing means for sensing a control input including a touch sensor, a fingerprint sensor, a motion sensor, a proximity sensor, an illumination sensor, a voice recognition sensor, a pressure sensor, and the like. The control input sensing unit 120 is a common name of the aforementioned various sensing means. The aforementioned sensors can be included in the device as a separate element or can be included in the device in a manner of being integrated as at least one or more elements. In particular, the control input sensing unit 120 may correspond to a unit for sensing a control input of a user, by which the present specification may be non-limited. And, as an example, a control input may corresponds to a gesture input and include various contact or noncontact inputs. And, the control input may correspond to an input inputted by an input device or an input inputted by voice or audio, by which the present specification may be non-limited. And, as an example, the control input sensing unit 130 may correspond to an element integrated with the display unit 110. As an example, the display unit 110 may correspond to a touch sensitive display unit 110.

The portable device 100 can include a camera unit 140 as an optional configuration. In this case, the camera unit 140 can sense and capture an image. More specifically, the camera unit 140 captures surrounding environment of the portable device 100 as an image and converts the image into an electrical signal. To this end, the camera unit 140 can include an image sensor. The image sensor can convert an optical signal into an electrical signal. The image, which is captured by the camera unit 140 and converted into the electrical signal, can be stored in a storage unit (not depicted). And, the processor 150 can display an image captured by the camera unit 140 in the display unit 110. And, as an example, the processor 150 can display a preview image of an image captured by the camera unit 140 in the display unit 110. Regarding this, it shall be described later with reference to FIGS. 8*a* and 8*b*. And, as an example, the camera unit 140 can be positioned at least one of the second body and the third body. And, the camera unit 140 can capture an image while positioning at the third body. In this case, for example, the camera unit 140 can capture the front direction of the second body or the third body as an image. As a different example, the camera unit 140 can capture the rear direction of the second body or the third body as an image. In particular, the camera unit 140 can be positioned to capture an image of the front direction or the rear direction of the portable device 100, by which the present specification may be non-limited.

The processor 150 may correspond to a unit for controlling at least one selected from the group consisting of the display unit 110, the folding sensor unit 120, and the control input sensing unit 130. And, the processor 150 may correspond to a unit for controlling the camera unit 140. More specifically, the processor 150 can receive folding information of the second body and the third body from the folding sensor unit 120. In this case, if both the second body and the third body are folded, the processor 150 can configure a first folded state. More specifically, if the second body is folded into the first body and the third body is folded into the first body, the processor 150 can configure a first folded state. In this case, if a folding angle between the second body and the first body is less than a threshold angle, the processor 150 can detect a folded state. And, as an example, if a distance between the second body and the first body is less than a threshold distance, the processor 150 can detect a folded state. In particular, the processor 150 can detect a state that the second body is folded into the first body on the basis of a prescribed threshold value, by which the present specification may be non-limited. And, the processor 150 can detect a folded state of the third body and the first body. The folded state can be detected by the same method used for the second body.

And, if the processor detects that a folding angle between the first body and the second body corresponds to a first angle or detects that the folding angle is changed within a threshold angle range from the first angle, the processor 150 can configure a second folded state. And, if the processor detects that a folding angle between the first body and the third body corresponds to a first angle or detects that the folding angle is changed within a threshold angle range from the first angle, the processor 150 can configure a second folded state. In this case, as an example, the first angle may correspond to an angle between 0 to 180 degrees. And, for example, the processor can configure the first angle with an angle between 0 to 90 degrees. And, the threshold angle may have a prescribed error range, by which the present specification may be non-limited. And, as an example, if the processor 150 detects that a distance between the first body and the second body corresponds to a first distance or detects that the distance is changed within a threshold distance from the first distance, the processor 150 can configure a second folded state. And, if the processor detects that a distance between the first body and the third body corresponds to a first angle or detects that the distance is changed within a threshold distance from the first distance, the processor 150 can configure a second folded state. In this case, the threshold distance may have a prescribed error range, by which the present specification may be non-limited. And, if the processor 150 detects that the first body and the second body are unfolded and detects that the first body and the third body are unfolded, the processor 150 can configure a third folded state.

In particular, if the first body, the second body, and the third body are all folded, the processor 150 can configure a first folded state. And, if the first body, the second body, and the third body are all unfolded, the processor 150 can configure a third folded state. And, if at least one of a folded state of the second body and a folded state of the third body is changed, the processor 150 can configure a second folded state. In this case, the second folded state may correspond to a middle state between the first folded state and the third folded state. The second folded state can be detected on the basis of a different value rather than an angle and a distance. Regarding this, it shall be described later with reference to FIG. 3.

The processor 150 can detect that the first folded state is switched to the second folded state using the folding sensor unit 120. In this case, the processor 150 can detect a first triggering signal. In this case, for example, the first triggering signal may correspond to a signal forwarded by the folding sensor unit 120. The processor 150 can display a menu interface based on the first triggering signal detected in the second folded state. In this case, for example, the menu interface may correspond to a multitasking menu interface, a bookmark menu interface, a history menu interface, or the like. Regarding this, it shall be described later with reference to FIG. 4.

The processor 150 can detect a first control input inputted on the menu interface which is displayed in the second folded state. In this case, the first control input can be detected by the control input sensing unit 130. The processor 150 can receive a signal sensed by the control input sensing unit 130. Subsequently, the processor 150 can detect that the second folded state is switched to the third folded state using the folding sensor unit 120. In this case, the processor 150 can execute a first application based on the aforementioned first control input. In particular, the processor 150 can execute an application based on a signal, which is detected in the middle of switching each body of the portable device 100 to an unfolded state from a folded state.

If the processor 150 detects that the first folded state is switched to the second folded state using the folding sensor unit 120, the processor 150 can detect a first triggering signal. In this case, the processor 150 can activate the camera unit 140 based on the first triggering signal. And, the processor 150 can execute a camera application. In this case, the processor 150 can detect a first control input using the control input sensing unit 130. In this case, the processor 150 can capture an image using the camera unit 140 based on the first control input. Subsequently, the processor 150 can detect that the second folded state is switched to the first folded state using the folding sensor unit 120. In this case, the processor 150 can display the captured image in the first folded state using the display unit 110.

The aforementioned elements can be included in the portable device 100 as a separate element or can be included in a manner of being integrated as at least one or more elements.

Figure 2:
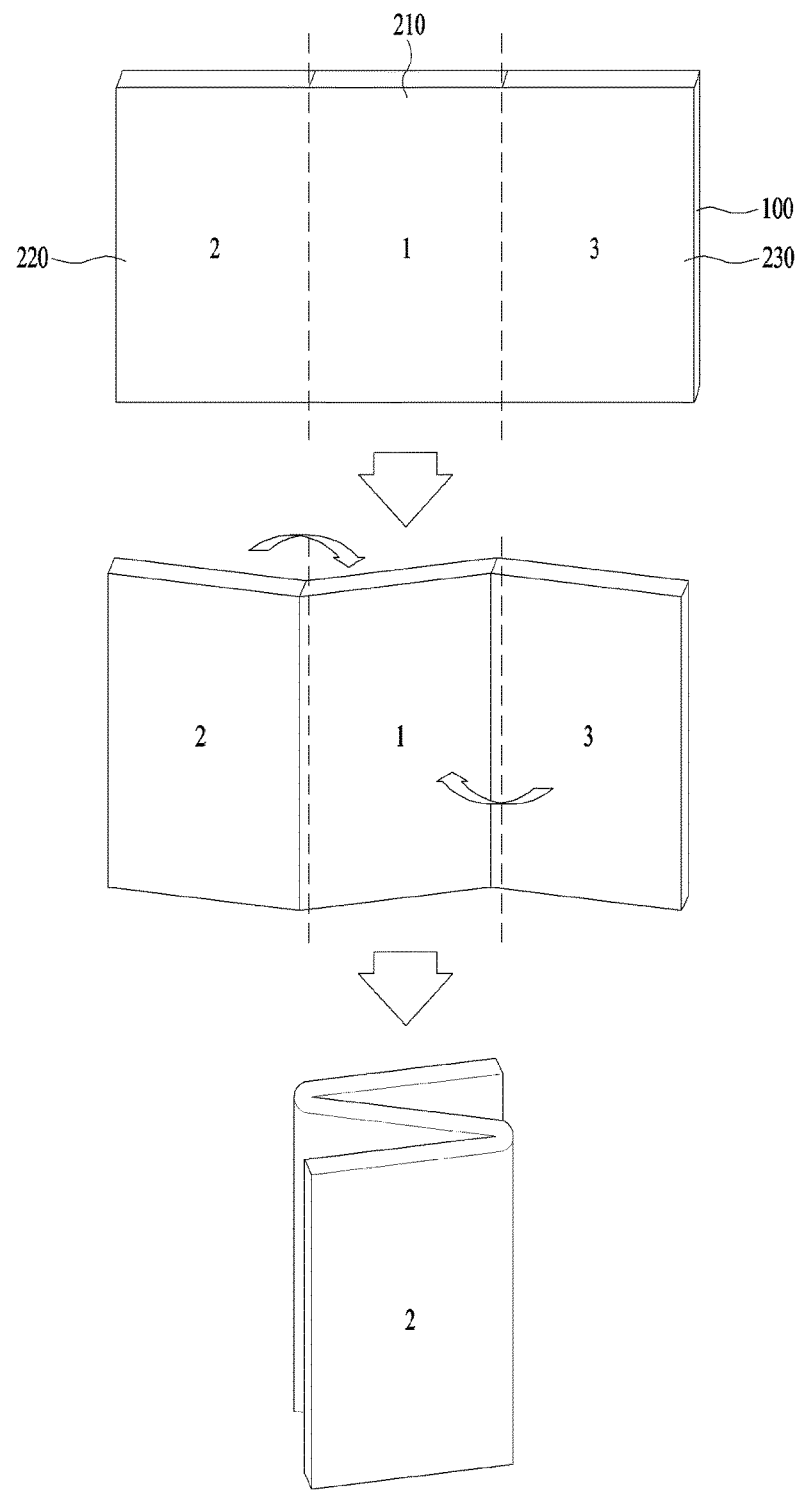
FIG. 2 is a diagram for a method of folding a portable device according to one embodiment of the present specification.

FIG. 2 is a diagram for a method of folding a portable device according to one embodiment of the present specification. As mentioned in the foregoing description, the portable device 100 can include the first body 210, the second body 220, and the third body 230. In this case, the second body 220 can be positioned on the left side of the first body 210. And, the third body 230 can be positioned on the right side of the first body 210.

The portable device 100 can make a first area, a second area, and the third area of the display unit 110 to be positioned at the front direction. In particular, the front direction may correspond to a direction in which an image is displayed in the portable device 100. And, the rear direction may correspond to a direction in which an image is not displayed in the portable device 100. In particular, when a user holds the portable device 100, the front direction corresponds to a direction facing the user and the rear direction corresponds to a direction opposite to the direction facing the user. In this case, as an example, the second body 220 can be folded into the first body 210 to make the front side of the second body 220 and the front side of the first body 210 to be overlapped with each other. And, the third body 230 can be folded into the first body 210 to make the rear side of the third body 230 and the rear side of the first body 210 to be overlapped with each other. In particular, the second body 220 and the third body 230 can be folded into the first body in a manner that the second body and the third body are contacted with a different side of the first body 210, respectively.

And, as a different example, the second body 220 can be folded into the first body 210 to make the rear side of the second body 220 and the rear side of the first body 210 to be overlapped with each other. And, the third body 230 can be folded into the first body 210 to make the front side of the third body 230 and the front side of the first body 210 to be overlapped with each other. In particular, the second body 220 and the third body 230 can be folded into the first body in a manner that the second body and the third body are contacted with a different side of the first body 210, respectively.

In particular, the portable device 100 including three bodies may have various folding structures, by which the present specification may be non-limited.

Figure 3C:
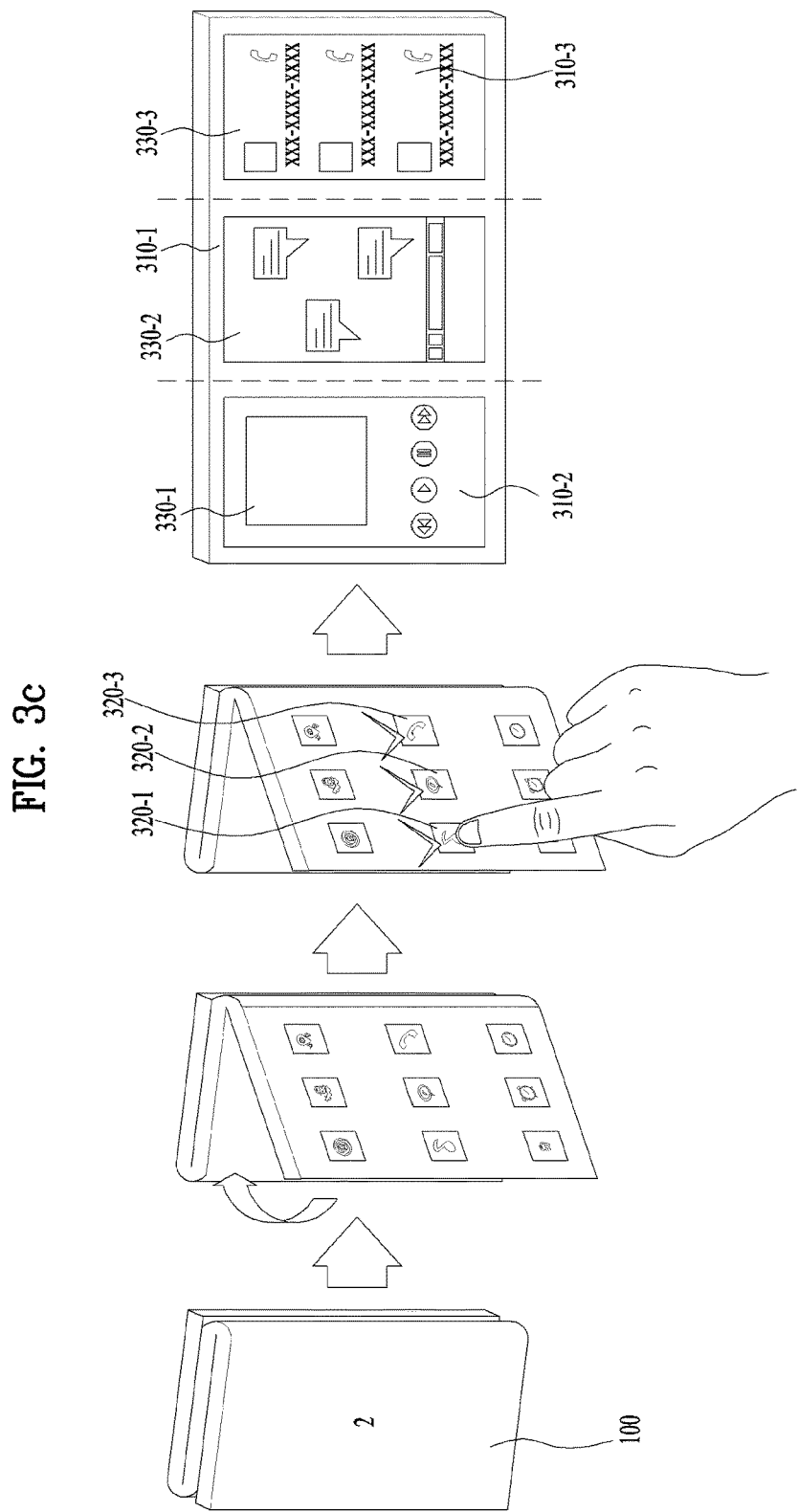

FIGS. 3*a* to 3*c* are diagrams of a method for a portable device to execute an application when a folded state is switched according to one embodiment of the present specification.

If the portable device 100 is switched to a second folded state from a first folded state, the portable device can detect a first triggering signal. In this case, the portable device 100 can display a menu interface in the switched second folded state based on the first triggering signal.

More specifically, referring to FIG. 3*a*, if the second body 220 or the third body 230 is unfolded from the first body, the portable device 100 can detect the second folded state. In this case, the second body 220 or the third body 230 may not be in a completely unfolded state. In particular, the second folded state may correspond to a middle state of switching between the first folded state and the third folded state, by which the present specification may be non-limited.

The portable device 100 can display a menu interface in a second area 310-2 of the second body 220 in the second folded state. In this case, as an example, the menu interface can include a plurality of objects. For example, an object may correspond to an icon for executing an application. And, for example, an object may correspond to an image, an interface, or the like, by which the present specification may be non-limited. In this case, the portable device 100 can detect a first control input for selecting a first object 320-1 included in the menu interface in the second folded state. In this case, as an example, the first object 320-1 may correspond to an object for executing a first application 330-1. For example, the first application may correspond to a music application. In this case, the processor 150 detects the first control input and may be then able to detect that the second folded state is switched to the third folded state. In this case, the portable device 100 can display the first application in the first area 310-1, the second area 310-2, and the third area 310-3. In particular, the portable device 100 can display the first application 330-1 in the third folded state based on the first object 320-1 selected in the second folded state.

Referring to FIG. 3*b*, as an example, the portable device 100 can further detect a first control input for selecting a first object 320-1 and a second control input for selecting a second object 320-2 in the second folded state. Subsequently, if the portable device is switched to the third folded state from the second folded state, the portable device 100 can display the first application 330-1 and the second application 330-2. In this case, for example, the second application 330-2 may correspond to an application corresponding to the second object 320-2. In this case, for example, the portable device 100 can display the first application 330-1 and the second application 330-2 with the same size. More specifically, the portable device can display the first application 330-1 in the second area and a partial area of the first area. And, the portable device can display the second application 330-2 in the third area and a partial area of the first area. In this case, a size of the first application 330-1 and a size the second application 330-2 may be the same. As a different example, the portable device 100 can display the first application 330-1 and the second application 330-2 based on a position relation between the first object 320-1 and the second object 320-2. More specifically, if the first object 320-1 is positioned on the left side of the second object 320-2, the portable device 100 can display the first application 330-1 on the left side of the second application 330-2 in the third folded state.

As a further different example, referring to FIG. 3*c*, the portable device 100 can further detect a third control input inputted on a third object 320-3. In this case, the portable device 100 can further display a third application 330-3 corresponding to the third object 320-3. More specifically, the portable device 100 can display an application in consideration of a position relation among the first object 320-1, the second object 320-2, and the third object 320-3. In particular, the portable device 100 can display the first application 330-1 in the second area 310-2. The portable device 100 can display the second application 330-2 in the first area 310-1. The portable device 100 can display the third application 330-3 in the third area 310-3. In particular, the portable device 100 can execute a plurality of applications in response to a plurality of objects included in the menu application.

FIG. 4 is diagram of a method for a portable device to execute an application when a folded state is switched according to one embodiment of the present specification. The portable device 100 can display first visual information 410 in the first folded state. In this case, as an example, the first visual information may correspond to an application, an image, a video, and the like. And, the first visual information may correspond to information capable of being displayed in the first folded state, by which the present specification may be non-limited. In this case, if the first folded state is switched to the second folded state, the portable device 100 can display a menu interface related to the first visual information 410. In this case, a plurality of objects 420-1 to 420-3 included in the menu interface may correspond to objects related to the first application 410. For example, the first visual information may correspond to an internet application. In this case, if the first folded state is switched to the second folded state, the portable device 100 can display a bookmark menu interface related to the internet application 410. In this case, the portable device can detect a control input inputted on the bookmark menu interface. Subsequently, if the second folded state is switched to the third folded state, the portable device 100 can display applications 430-1 to 430-3 based on the control input.

As a different example, the menu interface may correspond to a history menu interface. In this case, the portable device 100 can display an application based on a control input inputted on the history menu interface. In particular, the portable device 100 can display the menu interface for the visual information displayed in the first folded state.

Figure 5A:
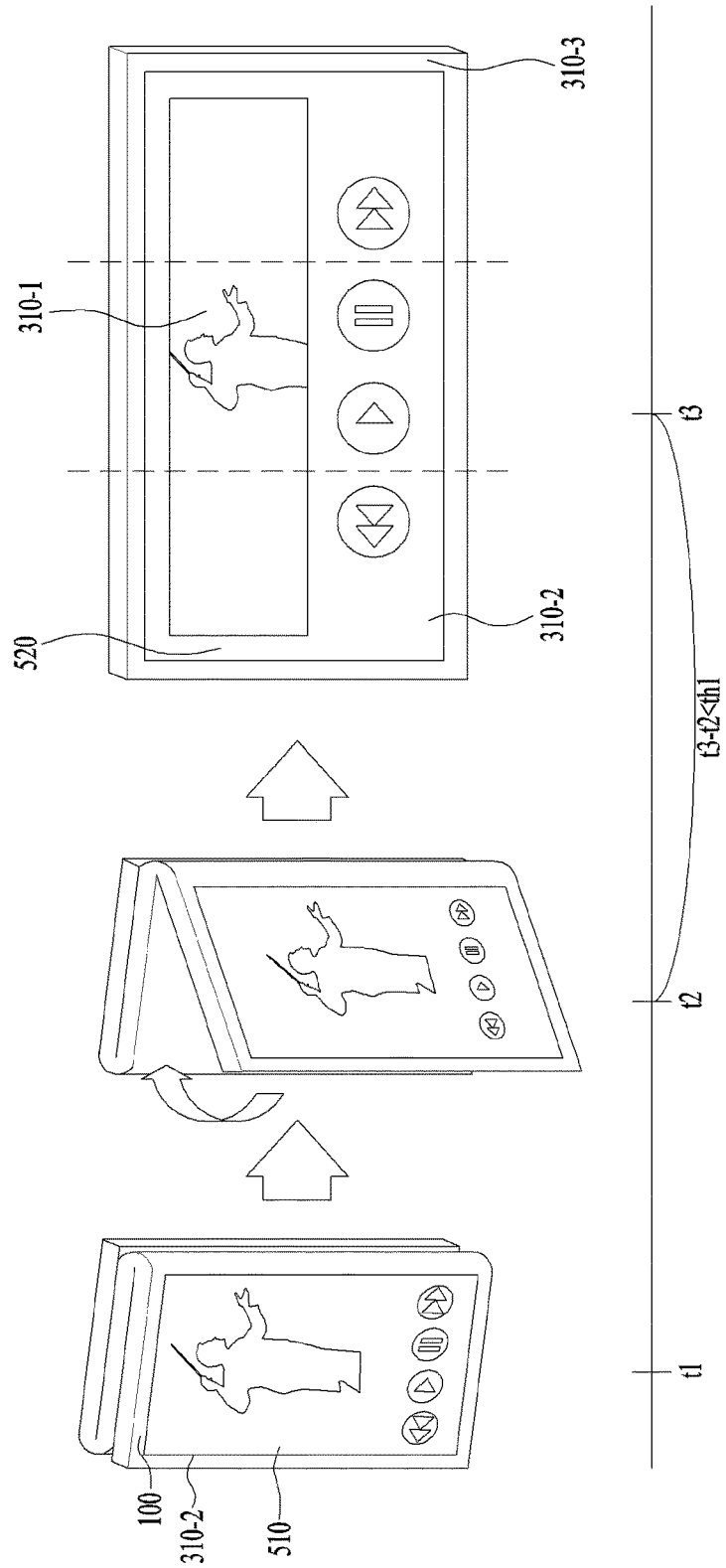

FIGS. 5a and 5b are diagrams of a method for a portable device to convert a folded state based on a threshold time according to one embodiment of the present specification. If the first folded state is switched to the second folded state, the portable device 100 can detect a first triggering signal. The portable device 100 can display a menu interface based on the detected first triggering signal. In this case, as an example, the portable device 100 can detect the first triggering signal when a threshold time elapses after being switched to the second folded state. In this case, the threshold time may correspond to a threshold time and may have a prescribed error. By doing so, the portable device 100 can selectively control whether or not the menu interface is displayed.

More specifically, referring to FIG. 5a, the portable device can display first visual information 510 in the first folded state. In this case, as an example, the portable device 100 can display the first visual information 510 in the second area 310-2. In this case, the first folded state can be switched to the second folded state. Subsequently, the second folded state can be switched to the third folded state within a threshold time. In particular, a user can quickly switch the portable device 100 to an unfolded state from a folded state. In this case, the portable device 100 can display the first visual information 510 in the third folded state in a manner of magnifying the first visual information. More specifically, the portable device 100 can display the first visual information 510, which was displayed in the second area 3102-2 only in the first folded state, in the first area 310-1, the second area 310-2, and the third area 310-3 in a manner of magnifying the first visual information. In particular, if a user quickly switches the portable device 100 to an unfolded state, the user can watch the magnified visual information while the portable device does not display the menu interface.

As an example, referring to FIG. 5b, the portable device 100 can detect that a threshold time elapses after being switched to the second folded state. In particular, a user may be able to unfold the second body 220 or the third body 230 in the first folded state and maintain the state for a prescribed time. In this case, the portable device 100 can display a menu interface in the second area 310-2. In this case, the portable device 100 can detect a control input inputted on the menu interface. Subsequently, if the second folded state is switched to the third folded state, the portable device 100 can display applications 550-1 to 550-3 based on the control input.

In particular, the portable device can control a method of displaying the menu interface on the basis of the threshold time.

Figure 6:
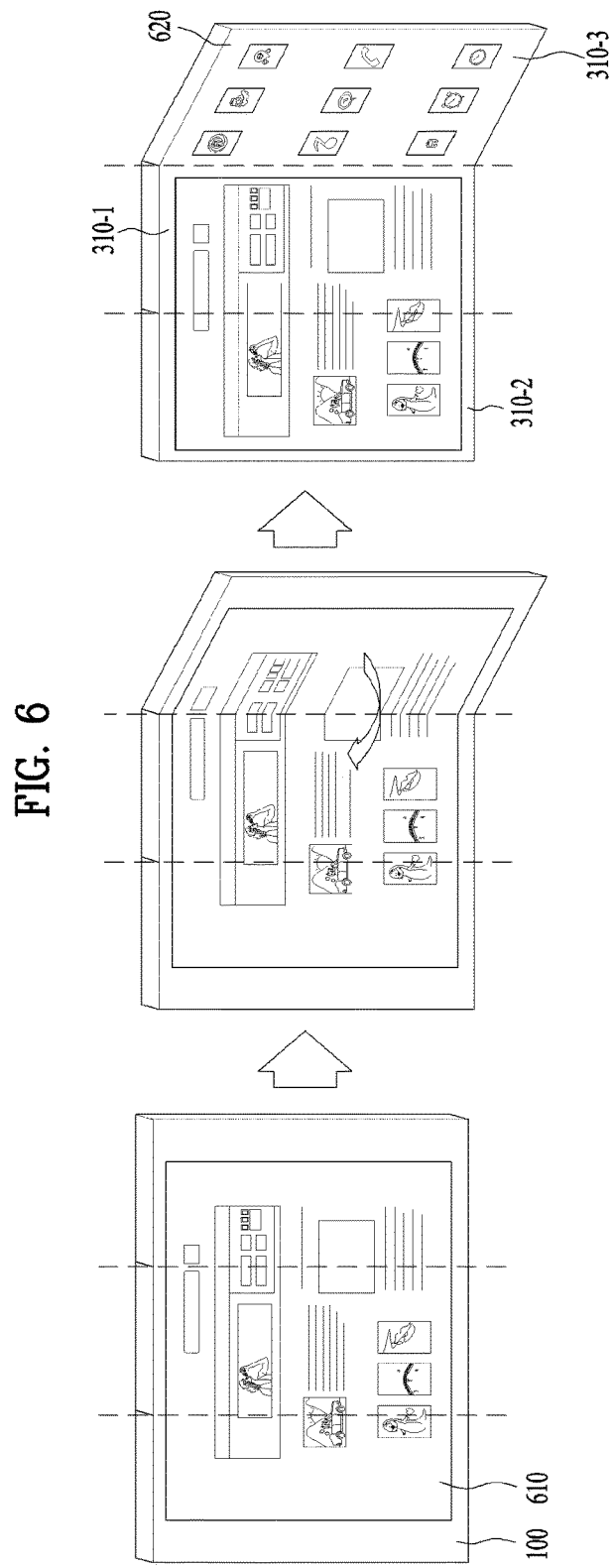
FIG. 6 is diagram of a method for a portable device to display a menu interface according to one embodiment of the present specification.

FIG. 6 is diagram of a method for a portable device to display a menu interface according to one embodiment of the present specification.

The portable device 100 can display a menu interface in the third folded state. In this case, as an example, the portable device 100 can detect that a folded state of one of the second body and the third body is changed in the third folded state. More specifically, the portable device 100 can detect that a folding angle between the first body and the second body is changed. In this case, for example, the portable device 100 can detect that the folding angle between the first body and the second body corresponds to a first angle or detect that the folding angle is changed within a threshold angle range from the first angle. In this case, the portable device 100 can detect a first triggering signal. The portable device can display a menu interface based on the detected first triggering signal. And, as an example, the portable device 100 can detect a change of the folded state based on a distance between the first body and the second body. For example, the portable device 100 can detect that the distance between the first body and the second body corresponds to a first distance or detect that the distance is changed within a threshold distance range from the first distance. In this case, the portable device 100 detects a first triggering signal and can display a menu interface based on the detected first triggering signal. In this case, a folded state between the first body and the third body may change. The folded state of the third body can be identically configured by the method applied to the second body.

And, as an example, if a changed folded state of one of the second body and the third body is maintained for a threshold time, the portable device 100 can detect a first triggering signal. By doing so, the portable device 100 can control whether or not a menu interface is displayed.

Figure 7A:
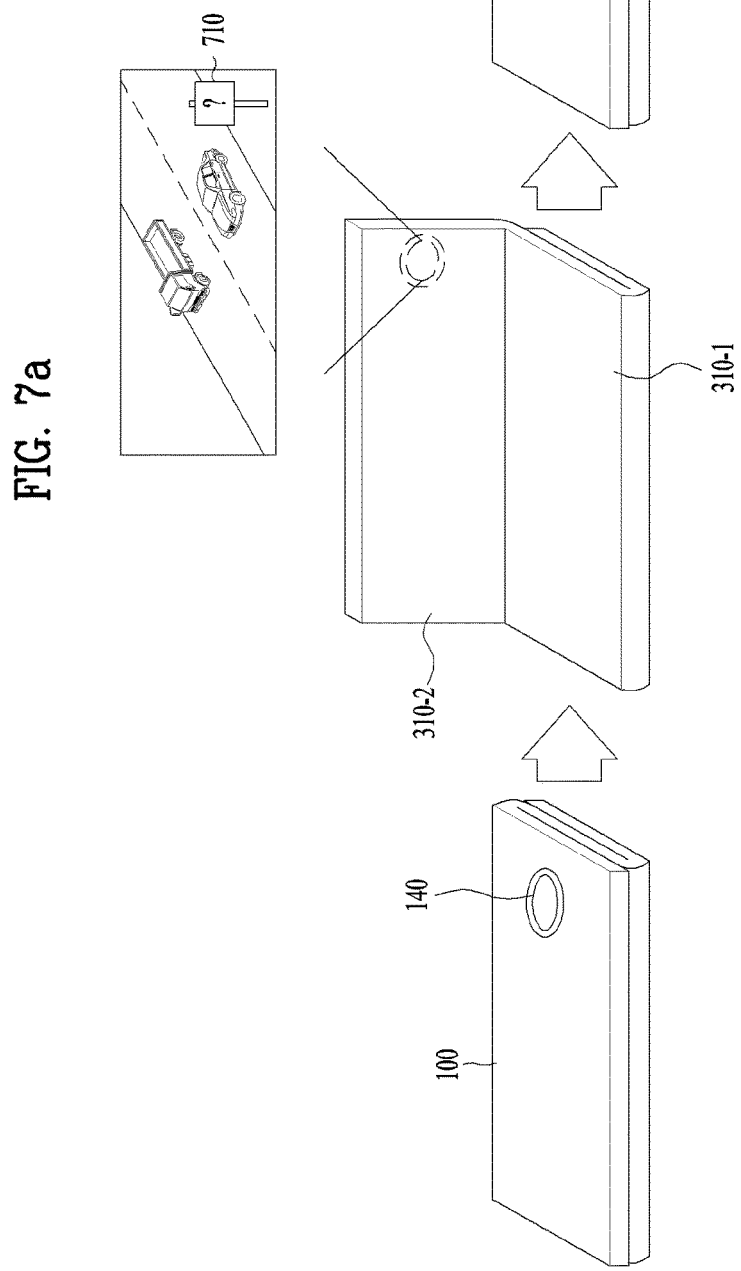

FIGS. 7a and 7b are diagrams of a method for a portable device to capture an image using a camera unit according to one embodiment of the present specification.

The portable device 100 can include a camera unit 140. In this case, for example, the camera unit 140 can be mounted on at least one of the second body 220 and the third body 230. And, the camera unit 140 can capture an image in the front direction of the portable device 100 or an image in the rear direction of the portable device 100, by which the present specification may be non-limited.

In this case, for example, referring to FIG. 7a, if the portable device is switched to the second folded state from the first folded state, the portable device 100 can detect a first triggering signal. In this case, for example, the second folded state may correspond to a state that a folding angle between the second body 220 including the camera unit 140 and the first body corresponds to a right angle or an angle equal to or less than a threshold angle from the right angle. In particular, the second folded state may correspond to a state capable of capturing a front image using the camera unit 140. In this case, the portable device 100 activates the camera unit 140 based on the detected first triggering signal and can execute a camera application. The portable device 100 can detect a first control input inputted on the camera application. The portable device 100 can capture an image in the front direction of the portable device based on the detected first control input.

In this case, referring to FIG. 7b, if the second folded state is switched to the first state, the portable device 100 can display the captured image 720 in the third area 310-3. In particular, the portable device 100 can activate the camera unit 140 and capture an image according to a folded state of each body.

In this case, as an example, the first folded state may correspond to a state that the first body 210, the second body 220, and the third body 230 are all folded and the display unit 110 is deactivated. More specifically, the portable device 100 can be configured as the first folded state only when the display unit 110 is deactivated. By doing so, the portable device 100 can control whether or not the camera unit 140 is activated.

As a different example, the portable device 100 can be configured by one of a portrait mode and a landscape mode. In this case, the portrait mode may correspond to a mode of using the portable device 100 in vertical orientation. And, the landscape mode corresponds to a mode of using the portable device 100 in horizontal orientation. As an example, the portable device 100 detects orientation of the portable device 100 via a sensor unit (not depicted) and can configure one of the portrait mode and the landscape mode based on the detected orientation. In this case, the portable device 100 can activate the camera unit 140 only when the portable device 100 is configured by the landscape mode. More specifically, if the first folded state is switched to the second folded state, the portable device 100 can detect a first triggering signal. In this case, if the portable device 100 is in the portrait mode, the portable device 100 deactivates the camera unit 140 and may not display a camera application. If the portable device is in the landscape mode, the portable device 100 activates the camera unit 140 and may not display a camera application.

In particular, the portable device 100 detects a first triggering signal and captures an image using the camera unit 140 only when the portable device is maintained in horizontal orientation.

FIGS. 8a and 8b are diagrams of a method for a portable device to display a captured image according to one embodiment of the present specification. The portable device 100 can capture an image 810 in the front direction in the second folded state based on a first control input. Subsequently, if the portable device 100 is switched to the third folded state from the second folded state, the portable device 100 can display the image 810 in the front direction in the first area 310-1, the second area 310-2, and the third area 310-3. In this case, as an example, if the portable device 100 is in vertical orientation, the portable device 100 can display the image 810 in the front direction in vertical orientation. And, for example, if the portable device 100 is in horizontal orientation, the portable device 100 can display the image 810 in the front direction in horizontal orientation. In particular, if the portable device 100 is switched to the third folded state from the second folded state, the portable device 100 can display the image 810 in the front direction in the first area 310-1, the second area 310-2, and the third area 310-3.

FIGS. 9a and 9b are diagrams of a method for a portable device to display a preview image for a captured image according to one embodiment of the present specification. The portable device 100 can display a preview image 920 for a captured image 910. In this case, as an example, the preview image 920 may correspond to an image identical to the image 910 captured in the front direction.

Referring to FIG. 9a, the portable device 100 can display the preview image 920 in the first area 310-1. More specifically, the portable device 100 can capture the image in the front direction using the camera unit 140 mounted on the second body 220. In this case, the first area 310-1 and the second area 310-2 of the display unit 100 can be displayed in a direction heading to a user. and, the third area 301-3 can be displayed in a direction opposite to a direction at which a user is facing. Hence, the portable device 100 displays the preview image 920 in the first area 301-1 to provide information on the captured image 910 to the user.

Referring to FIG. 9b, the portable device 100 can display the preview image in the second area 310-2. By doing so, the portable device 100 can provide information on the captured image 910 to a user. In particular, the portable device 100 can display the preview image 920 for the captured image 910 in at least one of the first area 310-1 and the second area 310-2. And, as mentioned in the foregoing description, if the portable device 100 is switched to the first folded state after an image is captured, the portable device 100 can display the captured image 910 in the third area 310-3.

Figure 10A:
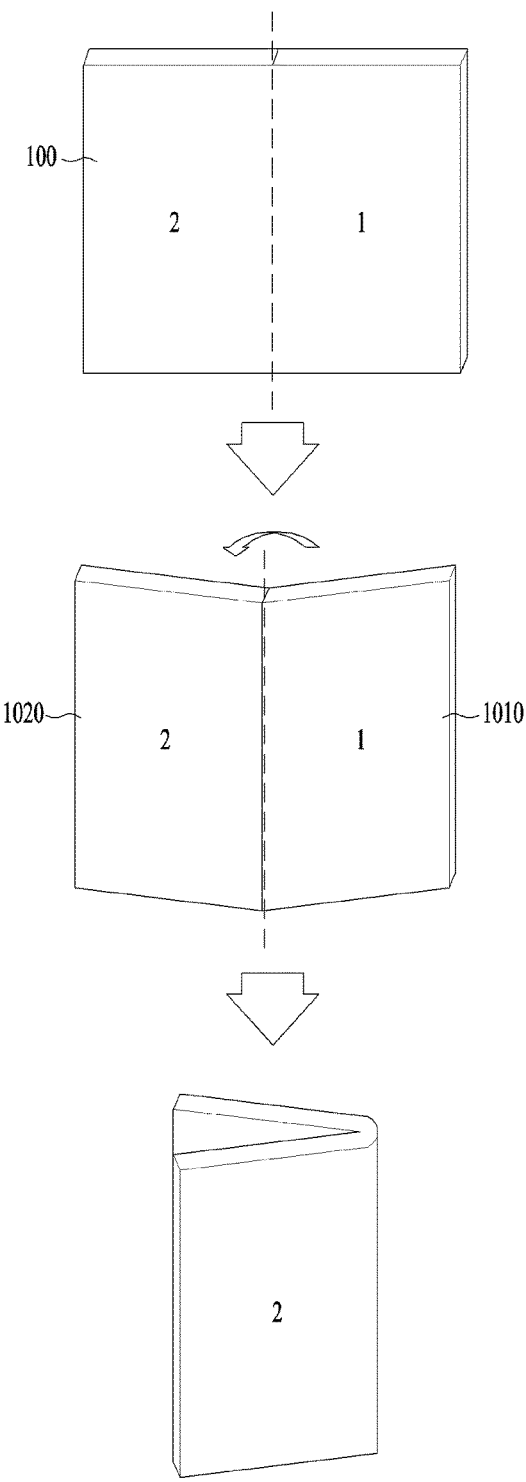

FIGS. 10a and 10b are diagrams of a method for a portable device including two bodies to execute an application. Referring to FIG. 10a, the portable device 100 can include a first body 1010 and a second body 1020. In this case, as an example, the second body 1020 can be folded into the first body 1010. In this case, if the second body 1020 is folded into the first body 1010, the portable device 100 can configure a first folded state. And, if a folded state of the second body 1020 is changed, the portable device 100 can configure a second folded state. And, if the first body 1010 and the second body 1020 are unfolded, the portable device 100 can configure a third folded state.

In this case, referring to FIG. 10b, if the portable device is switched to the second folded state from the first folded state, the portable device 100 can detect a first triggering signal. In this case, the portable device 100 can display a menu interface based on the detected first triggering signal. The portable device 100 can detect a first control input inputted on the menu interface. In this case, the menu interface can include a plurality of objects 1030-1/1030-2. Subsequently, the portable device 100 can switch the second folded state to the third folded state. In this case, the portable device 100 can display applications 1040-1/1040-2 based on the first control input. In particular, the portable device 100 may have a structure including two bodies and the structure can be identically controlled with a structure including three bodies.

Figure 11:
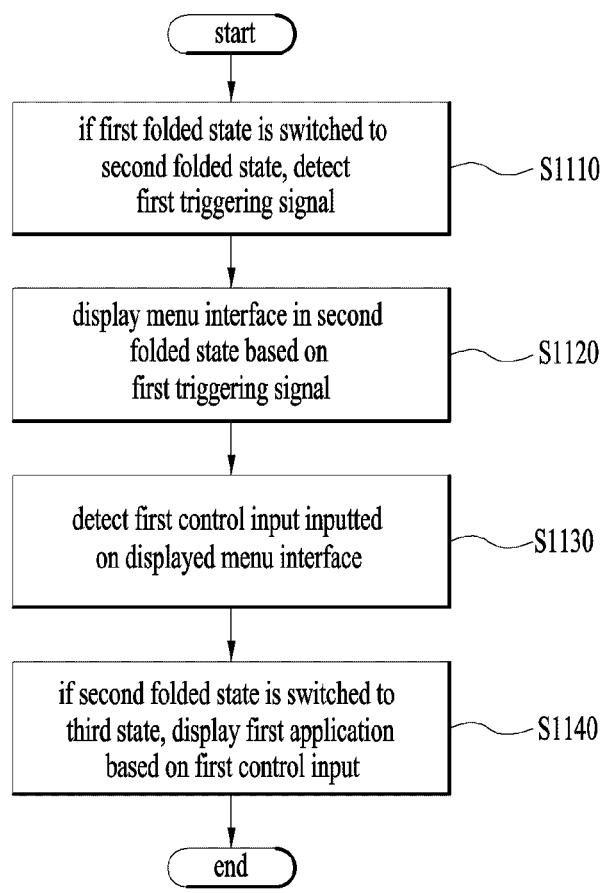
FIG. 11 is a flowchart for a method of controlling a portable device according to one embodiment of the present specification.

FIG. 11 is a flowchart for a method of controlling a portable device according to one embodiment of the present specification. If a first folded state is switched to a second folded state, the portable device can detect a first triggering signal [S1110]. In this case, as mentioned earlier in FIG. 1, the first folded state may correspond to a state that both the second body and the third body are folded into the first body of the portable device 100. And, a third folded state may correspond to a state that both the second body and the third body are unfolded from the first body and form a plane. And, the second folded state may correspond to a middle state between the first folded state and the third folded state. In this case, the second folded state may correspond to a state that an angle between the second body or the third body and the first body corresponds to a first angle or an angle within a threshold angle range from the first angle.

Subsequently, the portable device 100 can display a menu interface based on the first triggering signal in the second folded state [S1120]. In this case, as mentioned earlier in FIGS. 3a to 3b, the menu interface can include a plurality of objects. In this case, a plurality of the objects may correspond to an icon, an image, an interface, and the like.

Subsequently, the portable device 100 can detect a first control input inputted on the displayed menu interface [S1130]. In this case, as mentioned earlier in FIGS. 3a to 3c, the first control input may correspond to a control input inputted on an object included in the menu interface.

Subsequently, if the second folded state is switched to the third folded state, the portable device 100 can display a first application based on the first control input [S1140]. In this case, as mentioned earlier in FIGS. 3a to 3c, the portable device can display a first application related to the object selected by the first control input. In this case, if the portable device 100 detects a first control input selecting a plurality of objects, the portable device 100 can display a plurality of applications.

Figure 12:
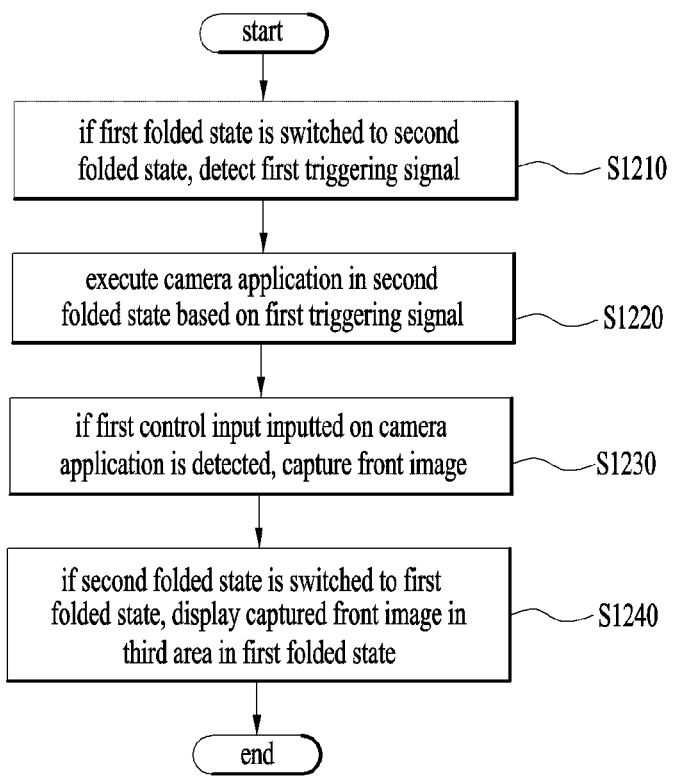
FIG. 12 is a flowchart for a method of controlling a portable device according to one embodiment of the present specification.

FIG. 12 is a flowchart for a method of controlling a portable device according to one embodiment of the present specification. If a first folded state is switched to a second folded state, the portable device can detect a first triggering signal [S1210]. In this case, as mentioned earlier in FIG. 1, the first folded state may correspond to a state that both the second body and the third body are folded into the first body of the portable device 100. And, a third folded state may correspond to a state that both the second body and the third body are unfolded from the first body and form a plane. And, the second folded state may correspond to a middle state between the first folded state and the third folded state. In this case, the second folded state may correspond to a state that an angle between the second body or the third body and the first body corresponds to a first angle or an angle within a threshold angle range from the first angle.

Subsequently, the portable device 100 can execute a camera application based on the first triggering signal in the second folded state [S1220]. In this case, as mentioned earlier in FIGS. 7a to 7b, the portable device 100 activates a camera unit 140 and can execute a camera application. And, as an example, the portable device 100 can execute the camera application based on the first triggering signal only when the display unit 110 is deactivated. And, for example, the portable device 100 can execute the camera application based on the first triggering signal only when the portable device is in a landscape mode.

Subsequently, if the portable device 100 detects a first control input inputted on the camera application, the portable device 100 can capture a front image [S1230]. In this case, as mentioned earlier in FIGS. 7a to 7b, the portable device 100 can capture an image in the front direction based on the detected first control input.

Subsequently, if the second folded state is switched to the first folded state, the portable device 100 can display the captured front image in the third area in the first folded state [S1240]. In this case, as mentioned earlier in FIGS. 8a to 8b, if the second folded state is switched to the third folded state, the portable device 100 can display the captured front image in the first area, the second area, and the third area. In particular, if the second folded state is switched to the first folded state after a front image is captured, the portable device 100 can display the captured image in a partial area only. And, if the second folded state is switched to the third folded state after a front image is captured, the portable device 100 can display the captured image in the entire area.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

And, the portable device 100 and controlling method therefor may not limitedly apply to the composition and method of the aforementioned embodiments. The aforementioned embodiments can be configured in a manner of being selectively combined the whole of the embodiments or a part of the embodiments to achieve various modifications.

Meanwhile, a portable device 100 and a method of controlling therefor of the present specification can be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, implementing in a form of a carrier wave such as a transmission via the internet and the like is also included in the recording media. And, since the recording media readable by the processor are distributed to the computers connected by a network, codes readable by the processor can be stored and executed in a manner of being distributed.

While the present specification has been described and illustrated herein with reference to the preferred embodiments thereof, it may be non-limited to the aforementioned specific embodiment and it will be apparent to those skilled in the art that various modifications and variations can be made therein without departing from the spirit and scope of the invention. Thus, it is intended that the technical idea and prospect of the present specification covers the modifications and variations of this invention.

And, both an apparatus invention and a method invention are explained in the present specification and the explanation on the both of the inventions can be complementally applied, if necessary.

MODE FOR INVENTION

Industrial Applicability

The present invention is usable in a user equipment and is applicable to an industry capable of being repeated.

What is claimed is:

1. A portable device containing a first body positioned at the center, a second body positioned on the left side of the first body, and a third body positioned on the right side of the first body, comprising:
    a display unit configured to display visual information in at least one of a first display area of the first body, a second display area of the second body, or a third display area of the third body;
    a folding sensor unit configured to detect whether or not at least one of the second body and the third body is folded into the first body; and
    a processor configured to control the display and the folding sensor unit,
    wherein the processor is configured to:
    when a first folded state of the portable device is switched to a second folded state, display a menu interface in the second display area, the menu interface including a plurality of icons, and
    when the switched second folded state of the portable device is switched to a third folded state after a first icon and a second icon are selected from the menu interface, display a first execution screen of a first application corresponding to the selected first icon in the second display area and a first partial area of the first display area, and display a second execution screen of a second application corresponding to the selected second icon in the third display area and a second partial area of the first display area.

2. The portable device of claim 1, wherein when folding of the second body folded to the first body and folding of the third body folded to the first body are detected, the processor is configured to set the first folded state.

3. The portable device of claim 1, wherein when unfolding of the second body unfolded from the first body and unfolding of the third body unfolded from the first body are detected, the processor is configured to set the third folded state.

4. The portable device of claim 1, wherein the processor is configured to set a middle state between the first folded state and the third folded state as the second folded state.

5. The portable device of claim 4, wherein when either a first folding angle between the first body and the second body or a second folding angle between the first body and the third body corresponds to a first angle or is within a threshold angle range from the first angle, the processor is configured to set the second folded state.

6. The portable device of claim 1, wherein the processor is configured to display the first execution screen of the first application and the second execution screen of the second application with the same size.

7. The portable device of claim 1, wherein when the first icon is displayed in a first position of the menu interface and the second icon is displayed in a second position of the menu interface, the processor is configured to display the first execution screen of the first application in a third position of the display unit and display the second execution screen of the second application in a fourth position of the display unit in the third folded state and wherein the third position and the fourth position correspond to the first position and the second position, respectively.

8. The portable device of claim 1, wherein when the first folded state is switched to the second folded state after first visual information is displayed in the second display area in the first folded state, the processor is configured to display the menu interface related to the first visual information in the second display area.

9. The portable device of claim 1, wherein the menu interface includes at least one of a multitasking menu interface, a bookmark menu interface, or a history menu interface.

10. The portable device of claim 1, further comprising a camera unit configured to be positioned at the second body and capture an image,
wherein the processor is further configured to:
when the first folded state is switched to the second folded state, activate the camera unit in the second folded state, and
when the switched second folded state of the portable device is switched to the first folded state after an image is captured via the camera unit, display the captured image in the third display area in the first folded state.

11. The portable device of claim 10, wherein when the portable device is in a landscape mode, the processor is configured to activate the camera unit.

12. A method of displaying information of a portable device containing a first body positioned at the center, a second body positioned on the left side of the first body, and a third body positioned on the right side of the first body, comprising:
when a first folded state of the portable device is switched to a second folded state, displaying a menu interface in a second display area of the second body, the menu interface including a plurality of icons; and
when the switched second folded state of the portable device is switched to a third folded state after a first icon and a second icon are selected from the menu interface, displaying a first execution screen of a first application corresponding to the selected first icon in the second display area and a first partial area of a first display area of the first body, and displaying a second execution screen of a second application corresponding to the selected second icon in a third display area of the third body and a second partial area of the first display area.

* * * * *